United States Patent [19]
Belding et al.

[11] Patent Number: 5,650,221
[45] Date of Patent: Jul. 22, 1997

[54] HIGH STRENGTH, LOW PRESSURE DROP SENSIBLE AND LATENT HEAT EXCHANGE WHEEL

[75] Inventors: William A. Belding, Danville, Calif.; Marc P. F. Delmas; William D. Holeman, both of Baton Rouge, La.; David A. McDonald, Kenner, La.

[73] Assignee: LaRoche Industries, Inc., Baton Rouge, La.

[21] Appl. No.: 498,628

[22] Filed: Jul. 6, 1995

[51] Int. Cl.$^6$ ................................................ B32B 5/16
[52] U.S. Cl. .................. 442/417; 162/157.2; 162/157.3; 162/157.5
[58] Field of Search ......................... 428/283; 162/157.2, 162/157.3, 157.5

[56] References Cited

U.S. PATENT DOCUMENTS

| | | |
|---|---|---|
| 3,024,867 | 3/1962 | Milton . |
| 3,266,973 | 8/1966 | Crowley . |
| 3,338,034 | 8/1967 | Hemstreet . |
| 3,713,281 | 1/1973 | Asker et al. . |
| 3,807,149 | 4/1974 | Norbaack . |
| 3,844,737 | 10/1974 | Macriss et al. . |
| 3,885,014 | 5/1975 | Fukada et al. .................. 264/205 |
| 4,012,206 | 3/1977 | Macriss et al. . |
| 4,093,435 | 6/1978 | Marron et al. . |
| 4,134,743 | 1/1979 | Macriss et al. . |
| 4,172,164 | 10/1979 | Meyer et al. . |
| 4,255,171 | 3/1981 | Dravnieks . |
| 4,668,249 | 5/1987 | Purdue . |
| 4,749,388 | 6/1988 | Francois . |
| 4,769,053 | 9/1988 | Fischer, Jr. . |
| 5,238,052 | 8/1993 | Chagnot . |
| 5,256,476 | 10/1993 | Tanaka et al. . |
| 5,300,138 | 4/1994 | Fischer et al. . |

*Primary Examiner*—Christopher W. Raimund
*Attorney, Agent, or Firm*—Andrew Alexander

[57] ABSTRACT

A sensible and latent heat exchange or adsorbent media formed from an improved desiccant or adsorbent paper having higher strength and thinner gauge to provide increased area of media, the media having a multiplicity of passageways therethrough through which an air stream can flow. The improved desiccant or adsorbent paper is comprised of fibrillated organic fibers formed to provide an improved support material having improved levels of strength and higher levels of desiccant or adsorbent material contained in the improved fibrous support material to provide the improved paper. The improved desiccant paper is capable of adsorbing or transferring sensible heat from a warm air stream and releasing or transferring the absorbed sensible heat into a cool air stream as the air stream flows though the sensible and latent heat exchange media. Further, the desiccant or adsorbent material is capable of adsorbing moisture from a humid air stream flowing through the sensible and latent heat exchange media and capable of releasing the adsorbed moisture into a dry air stream flowing through the passageways of the sensible and latent heat exchange media.

38 Claims, 1 Drawing Sheet

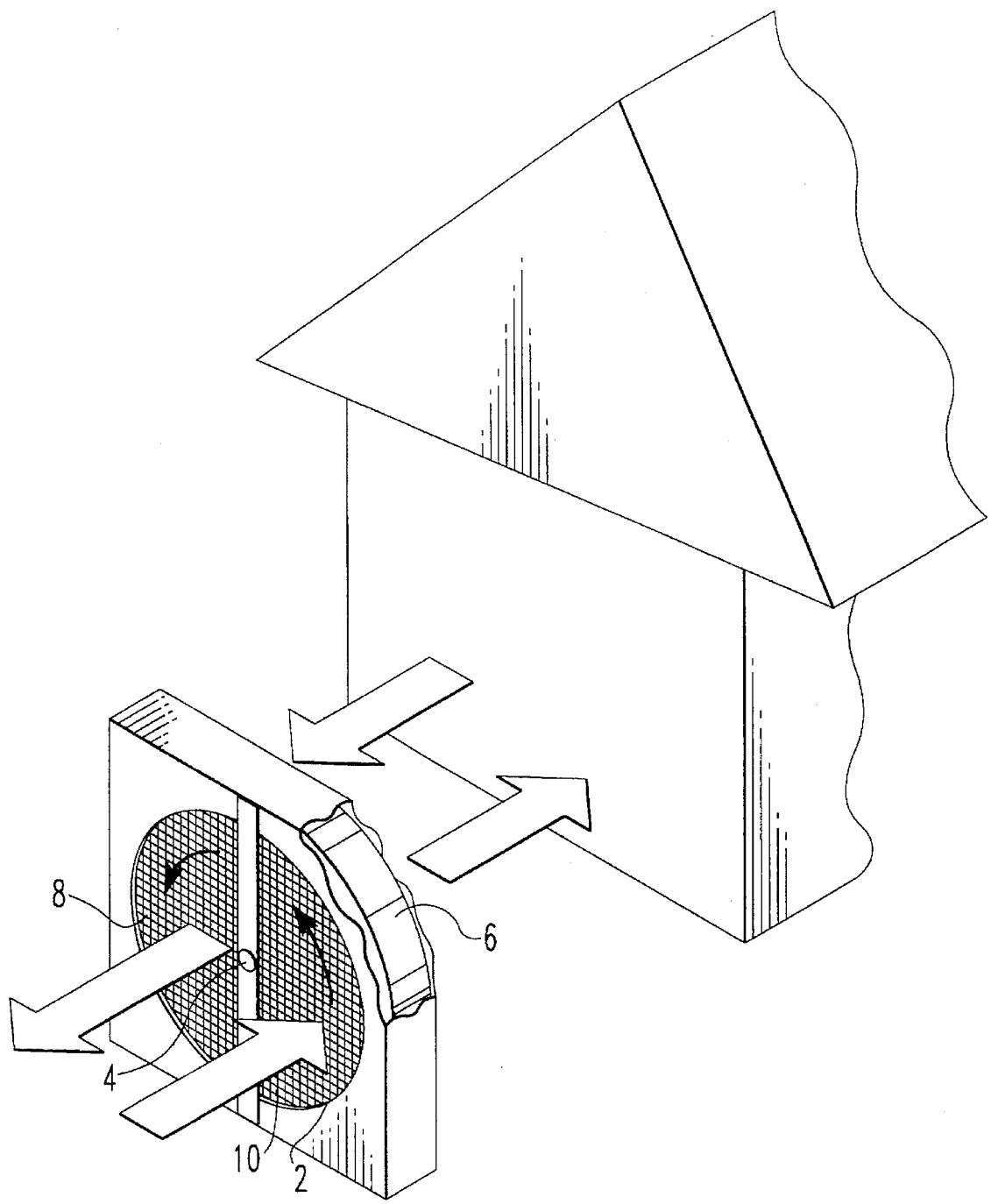

HIGH STRENGTH, LOW PRESSURE DROP SENSIBLE AND LATENT HEAT EXCHANGE WHEEL

BACKGROUND OF THE INVENTION

This invention relates to a sensible and latent heat exchange wheel by which heat and moisture are exchanged between a supply air stream and an exhaust air stream, and more particularly, the invention relates to a higher strength desiccant paper suitable for fabricating into an enthalpy wheel for aiding in regulating the temperature and humidity of ambient air.

Enthalpy wheels or heat exchange wheels are mounted across a supply air stream and an adjacent exhaust air stream. The wheels rotate and continuously remove heat and/or moisture from one stream and return heat and/or moisture to the adjacent stream. The wheels are usually fabricated to provide a multiplicity of parallel pores or openings such as a honeycomb structure through which the air passes. The wheels can be formed from coated material such as aluminum, plastic and paperboard or desiccant paper having one side corrugated and one side flat. The wheels are formed by winding the coated material or desiccant paper into the wheel shape to provide air passageways parallel to the axis of the wheel.

However, one of the problems with the desiccant paper is that it has to be relatively thick in order to have the strength necessary for the wheel. This results in resistance to flow of air through the wheel requiring higher air pressures and consequently more power to operate. Further, thicker paper requires that wheels have to be larger and thus heavier, often compromising the design of the wheel. Thus, it will be seen that it is desirable to have thin, strong desiccant paper to minimize pressure drop and to obtain maximum area of desiccant paper per unit of volume to improve efficiency.

The desiccant paper is comprised of a matrix or media capable of absorbing moisture and/or thermal energy from one stream and upon further rotation of the wheel, releasing the moisture and/or thermal energy to the adjacent stream which is to be conditioned. For example, the wheel can be used to recover moisture and heat from exhaust air at relatively high temperature for transfer to incoming air which is relatively dry and cool. Also, the wheel can be used to dehumidify and cool a moist, hot incoming stream by extracting moisture and heat from such stream and transferring the same to an exhaust stream from an air conditioned building that is relatively cooler and drier.

To improve indoor air quality, there is a great need to increase levels of outdoor air ventilated into buildings. However, it is important to minimize the cost associated with the introduction of outside air. For example, in winter, introducing cold, dry outdoor air to a building increases the heating load and adds to the fuel requirement. In summer, introduction of warm, humid outdoor air adds greatly to the air conditioning costs. Thus, to minimize costs associated with introduction of fresh air, heat exchangers such as rotating wheels have been employed to recover or reject, as needed, a portion of the sensible heat from the indoor air stream through exchange with the outdoor air stream. Further, some of the heat exchangers provide for latent heat exchange by incorporating a desiccant into the heat exchange surface. Thus, in summer, moisture in an outdoor air stream being introduced to a building is removed and transferred to drier indoor air stream exiting the building. Conversely, in winter, moisture from air being ventilated from the building is adsorbed by the desiccant and subsequently desorbed into the drier outside air being introduced to the building. Thus, such heat exchangers transfer both sensible and latent heat and are often referred to as a total energy exchanger or an enthalpy exchanger. However, while these devices are very desirable for purposes of conserving energy and reducing heating and cooling bills, they have not found widespread acceptance.

Prior references recognize the need for safe heat exchange devices. U.S. Pat. No. 4,093,435 discloses a rotary regenerative total heat energy exchanger having an asbestos-free heat exchange media formed by spirally winding flat and corrugated webs of aluminum foil and/or fully bleached, 45 lb Kraft paper constituted by 84% fibers and 16% salts. The patent notes that single-faced corrugated paperboard is made using a conventional silicate-type glue between a flat ply and a corrugated ply and that each ply is a Kraft paper treated with a mixture of ammonium sulfide and diammonium phosphate. However, such constituents can result in biological growth because the paper is primarily wood pulp based. Further, the wood pulp based papers tend not to age well in continuous long term use.

U.S. Pat. Nos. 3,844,737; 4,012,206 and 4,134,743 disclose the use of zeolites as a desiccant in a regeneratable heat exchange apparatus. The apparatus comprises a rotatable wheel fabricated from a paper support material comprised of cellulose fibers, glass fibers, asbestos, synthetic plastic fibers and zeolite desiccant in the amount of 1 to 90 wt. %.

Adsorbents and fibrous materials and desiccant wheels are disclosed in U.S. Pat. Nos. 3,024,867; 4,012,206; 4,769,053; 3,266,973; 3,338,034 and 4,255,171.

In spite of these disclosures, there is still a need for an improved desiccant paper and wheel formed therefrom having improved mechanical strength yet sufficiently thin for reduced pressure drop to provide a high level of sensible as well as latent heat exchange in a compact, efficient and low cost unit.

SUMMARY OF THE INVENTION

It is an object of the invention to provide an improved enthalpy or adsorbent media.

It is another object of this invention to provide an improved enthalpy wheel fabricated from an improved desiccant paper.

It is a further object of this invention to provide an enthalpy or adsorbent wheel having improved surface area per unit of volume.

It is a further object of this invention to provide an improved enthalpy or adsorbent wheel having a reduced pressure drop.

Yet, it is another object of this invention to provide an improved desiccant or adsorbent paper suitable for use in a total energy wheel, permitting increased efficiency of said wheel.

And, still it is another object of this invention to provide an improved adsorbent paper utilizing activated carbon and the like for purification of air.

These and other objects will become apparent from a reading of the specification and claims appended hereto.

In accordance with these objects, there is disclosed a sensible and latent heat exchange or adsorbent media formed from an improved desiccant or adsorbent paper having higher strength and thinner gauge to provide increased area of media, the media having a multiplicity of passageways therethrough through which an air stream can flow. The improved desiccant or adsorbent paper is comprised of fibrillated organic fibers formed to provide an improved support material having improved levels of strength and higher levels of desiccant or adsorbent material contained in the improved fibrous support material to provide the improved paper. The improved desiccant paper is capable of adsorbing or transferring sensible heat from a warm air stream and releasing or transferring the absorbed sensible heat into a cool air stream as the air stream flows through the sensible and latent heat exchange media. Further, the desiccant or adsorbent material is capable of adsorbing moisture from a humid air stream flowing through the sensible and latent heat exchange media and capable of releasing the adsorbed moisture into a dry air stream flowing through the passageways of the sensible and latent heat exchange media.

BRIEF DESCRIPTION OF THE DRAWINGS

The sole FIGURE shows a schematic of a heat exchange wheel in a cassette in accordance with the invention.

DETAILED DESCRIPTION OF THE PREFERRED EMBODIMENTS

Referring now to the FIGURE, there is shown a schematic of an enthalpy wheel 2 in accordance with the invention. The wheel, which is shown in a cassette, has a central hub and shaft 4 for support means for supporting the wheel within the cassette and a cylindrical outer casing 6. Other support means may be used. Further, the wheel may have radial spokes (not shown) extending from hub 4 to outer casting 6. Schematically, wheel 2 is shown divided into two parts, 8 and 10. An exhaust air stream is shown exiting through part 8 and air or inlet stream is shown flowing through part 10 countercurrent to the exhaust stream. Wheel 2 transfers both latent and sensible heat energy from the exhaust stream from a room or building or the like to the intake stream to the room from a fresh air supply stream. Depending on the season, in winter, for example, moisture in the exhaust stream is absorbed by the wheel and desorbed into make-up air. In summer, moisture in the make-up air is absorbed by the wheel and removed from the wheel by the drier exhaust stream. These functions are performed on a continuous basis as the wheel rotates and is regenerated by the countercurrent flow. The wheel typically rotates at a speed of about 1 to 50 rpm.

Between central hub 4 and outer casing 6 is a total heat energy and moisture exchange or adsorbent media 12. In one embodiment, the media is fabricated by providing alternating layers of flat and corrugated adsorbent paper or desiccant paper that is positioned to provide a multiplicity of open-ended passages parallel to the axis of rotation to permit air to flow therethrough. Typically, the media is formed by winding a web of corrugated adsorbent paper or desiccant paper (having a flat sheet of paperboard bonded to one side) around hub 4 until a multi-layered media is built up that extends to outer casing 6. The corrugated adsorbent or desiccant paper having one side flat is made by bonding or positioning a flat strip of paperboard over a corrugated strip of desiccant paper. The width of the strip determines the width of the wheel and the edges of the paperboard forms the faces of the wheel. It should be understood other fabrication techniques that form passages, e.g., honeycomb-shaped passages and the like, may be used, all of which are contemplated within the purview of the invention.

It should be understood that while the invention is described in wheel form, the invention can be a monolith of adsorbent or total heat energy and moisture exchange media and an airstream for conditioning or regeneration may be directed alternately between different parts of the media. Further, while the desiccant or adsorbent paper is described having the desiccant or adsorbent incorporated therein during fabrication of the paper, the paper may be formed and desiccant or adsorbent coated thereon. Or, a combination of desiccant or adsorbent incorporation during paper making and coating with desiccant or adsorbent thereafter may be used.

The improved desiccant paper in accordance with the invention is comprised of desiccant or adsorbent, fibrous material and optional binders.

The desiccant can be any material capable of efficiently adsorbing moisture from an air stream and capable of efficiently desorbing said moisture to a counter flowing air stream. Thus, the desiccant can comprise the use of finely powdered solid, crystalline compounds capable of adsorbing and desorbing moisture from or to an air stream. Examples of such adsorbants are silica gels, activated aluminas and molecular sieves or zeolites and the like and mixtures of these compounds. Other compounds that may be used are halogenated compounds such as halogen salts including chloride, bromide and fluoride salts, for example.

The preferred desiccants are zeolites. The zeolites can be natural crystalline zeolites such as stilbite or synthetic crystalline alumino-silicates referred to as molecular sieves. These materials are activated for adsorption by removing physically adsorbed water from openings in their molecular structure. Further, crystalline zeolites are preferred desiccants over alumina and silica gel because they exhibit less hysteresis during desorption which provides a more efficient moisture exchange between exit and intake air streams. In addition, zeolites are preferred desiccant material over activated aluminas and silica gels because activated aluminas and silica gels have a wide pore size distribution, 8 Å to 70 Å for activated aluminas and 8 Å to 100 Å for silica gels. The large pores in the structure can retain airborne contaminants, some of which may impart odor, and these compounds can be desorbed into the make-up air stream returning the contaminants and odors to the building. Thus, purification of air in the building has been compromised. In certain instances, the silica and alumina can be combined with the zeolite, depending on the shape of the isotherm desired. For purposes of the invention, synthetic zeolites are preferred over natural zeolites because the natural occurring zeolites can have a broader pore size distribution.

Synthetic zeolites include zeolites A, D, L, R, S, T, X and Y. Zeolite A is a crystalline zeolite having the general formula:

wherein M is metal, n is the valence of M and y may be any value up to 6. The zeolitic molecular sieves generally known in the art as 4A molecular sieves have a pore diameter of about 4 Å and have an alumino silicate crystalline structure A with sodium cations. 3A sieves have an alumino silicate structure A with sodium and potassium cations. In 3A molecular sieves, most of the sodium cations in a 4A molecular sieve are substituted with potassium cations which results in most of the pores in a 3 Å molecular sieve being 3A in diameter. In 5A molecular sieves, most of the sodium cations in a 4A molecular sieve are substituted with calcium cation and most of the pores in the 5A molecular sieve have about a 5 Å diameter.

Zeolite X, for example, has an ideal composition given by:

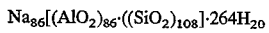

Cations may be exchanged so that the above formula is not absolute. Zeolites X and Y have topologically similar aluminosilicate framework structures, although they are distinct zeolite species with characteristic differences. The chemical compositions of zeolites X and Y are related to the synthesis method. The zeolites are distinguished on the basis of chemical composition, structure and their related physical and chemical properties. Differences are found in the cation composition and distribution, the Si/Al ratio and possible Si—Al ordering in tetrahedral sites. Typically, the Si/Al ratio for a zeolite X is between 1 and 1.5 whereas it is greater than 1.5 for a Y zeolite. Zeolites HY and USY may be obtained from NaY zeolites by different schemes: thermal decomposition of $NH_4^+$, hydrogen ion exchange, hydrolysis of a zeolite containing multivalent cations during dehydration. By the use of "zeolite" or "molecular sieve" as used herein is meant to include aluminosilicate, aluminophosphates, silica aluminophosphates, silicates and titanium aluminosilicates.

For purposes of the present invention, suitable molecular sieves include 3A, 4A, 5A, 13X, NaY, HY and USY with 3A and 4A molecular sieves being preferred.

Desiccant suitable for use in the present invention can have a particle size ranging from 0.1 to 50 μm with a preferred particle size being 1 to 4 μm.

Adsorbents for purifying air may be used in the present invention and include activated carbon and molecular sieves for adsorption of volatile organic compounds. The activated carbons are particularly useful in adsorbing volatile organic compounds and thereby purifying air.

In the present invention, any type of fibrous material can be used that can be fibrillated and thereafter formed by standard paper-making processes into adsorbent paper or desiccant paper having adsorbent or desiccant contained therein. Examples of such fibers include wood pulp, e.g., cellulosic fibers, and synthetic fibers and mixtures thereof. Inorganic fibers, such as glass or metal fibers and rock wool, etc., are not particularly suitable but may be used in conjunction with fibrillated organic fibers. That is, non-fibrillated, inorganic and organic fibers may be used in conjunction with the fibrillated fibers. The amount of fibrillated and non-fibrillated fibers can be adjusted to suit the particular need. By fibrillated fiber as used herein is meant fiber shafts which are split at their ends to form fibrils, i.e., fine fibers or filaments much finer than the fiber shafts.

Examples of fibrillated, synthetic organic fibers useful in the invention include polymeric fibers selected from the group consisting of high-density polyethylenes, high-density polypropylenes, aromatic polyamides (aramids), polystyrenes, aliphatic polyamides, polyvinyl chlorides, polyesters, nylons, rayons (cellulose acetate), acrylics, acrylonitrile homopolymers, copolymers with halogenated monomers, styrene copolymers, and mixtures of polymers (polypropylene with low-density polyethylene, and high-density polyethylene with polystyrene). Synthetic, organic fibers can be in staple form (chopped yarns), fabricated form (staple that has been refined) or extruded/precipitated form (i.e., polymer dissolved in a solvent precipitated by a non-solvent or other forming technique).

The preferred fibers for forming into desiccant paper for use in the present invention are fibrillated aramid and acrylic fibers. The preferred aramid fiber is formed from a long-chain synthetic aromatic polyamide having at least 85% of the amide (—CO—NH—) linkages directly attached to the two aromatic rings. A preferred fibrillated aramid fiber is available from E. I. du Pont de Nemours & Company under the designation KEVLAR® 303. In forming fibrillated KEVLAR® material, high shear is applied to KEVLAR® fiber shafts which split at their ends into fibrils to create a tree-like structure. In the production of adsorbent or desiccant paper, the fibrils interlock to enhance the paper strength and provide increased area for capturing or securing adsorbent particles. Additional refining of the fibers may be performed to further enhance paper strength. KEVLAR® is stable in oxidizing atmospheres up to 450° C. Other high-temperature aramid fibers such as NOMEX® available from Du Pont, TWARON® available from AKZO Fibers Inc., and TEIJINCONEX® and TECHNORA® available from Teijin Ltd. Japan, are also suitable materials.

Other preferred fiber which have been found to be highly suitable in the present invention are acrylic fibers such as fibrillated acrylic fibers available from American Cyanamid under the designation CFF®.

It should be noted that if the fibers are not available in fibrillated form, fibers can be fibrillated by transferring a slurry of the fibers to a disc or other high shear refiner to split the ends of the chopped fibers or shafts to provide fibrils thereon. In addition, fibrillater shafts available from the manufacturer can be further refined to increase the degree of fibrillation on the shafts which results in a higher degree of interlocking and consequently stronger desiccant or adsorbent paper.

Thus, preferably the shafts or chopped fibers can be provided in a length in the range of 1 to 30 mm, and typically in the range of 3 to 15 mm, prior to fibrillation. Further, preferably the shafts or chopped fibers have a diameter in the range of 1 to 50, typically 5 to 25 μm, prior to fibrillation. In fibrillated form, such chopped fibers have fibrils extending therefrom having lengths in the range of 0.5 to 28 mm and preferably in the range of 1 to 10 mm, and such fibrils typically have a diameter in the range of 0.5 to 40 μm and preferably in the range of 1 to 10 μm.

The fibrillation of the chopped fibers is an important aspect of the present invention. That is, it has been discovered that not only do the fibrillated fibers provide for higher strength in the desiccant or adsorbent paper, but also, it provides for thinner desiccant paper which is very important because of the resultant reduced air flow pressure drop across the media during operation. Further, more efficient adsorption and desorption is achieved. That is, an enthalpy wheel can be made deeper or wider for better adsorption and yet not require higher pressures, thereby raising the efficiency of the wheel. For example, enthalpy wheels formed from the improved desiccant paper can have up to about 25% increase in depth for about the same pressure drop across the wheel.

The fibrillated fibers are important in yet another way. That is, surprisingly, it has been discovered that higher loading of desiccant or adsorbent can be achieved utilizing fibrillated fibers. That is, the fibrils not only provide for thinner and stronger adsorbent paper, but the fibrils provide additional surface area on and in which desiccant or adsorbent can attach or anchor. Thus, compared to non-fibrillated shafts, fibrillated fibers provide for higher loading of desiccant or adsorbent in paper having desiccant or adsorbent dispersed therein without loss in strength of the paper.

The paper of the present invention can be prepared by wet-laying the desiccant and fibrillated fibers into a continuous sheet or web or into a hand sheet. The paper may then be formed into a single-faced corrugated laminate, which is spirally wrapped to make the adsorbent wheel. The fibrillated organic fibers provide highly suitable reinforcement at levels as low as 15 wt. % of the total desiccant paper structure due to their strength and ability to interlock. Some desiccant papers of suitable strength can be made having less than 10 wt. % fibers with very high sorbent loading when made in accordance with the invention.

Desiccant or adsorbent paper used in wheels in accordance with the invention can comprise 5 to 85 wt. % desiccant or adsorbent, the remainder comprising fibrous material. Binder can be added as needed. For example, if cellulose fibers from wood pulp are used in sufficient quantity, binder does not have to be added. Typical composition ranges can comprise 5 to 70 wt. % desiccant or adsorbent, the remainder comprising fibrous material and binder. A typical composition comprises about 38 wt. % fibrous material, about 50 wt. % desiccant or adsorbent and about 12 wt. % binder. The adsorbent paper can contain 15 to 75 wt. %, typically 30 to 55 wt. %, fibrillated fibers, 1 to 20 wt. %, typically 5 to 15 wt. %, binder with the balance being adsorbent.

For purposes of making desiccant or adsorbent paper in accordance with the invention, the fibrillated fibrous material is first dispersed in an aqueous dispersion.

Desiccant or adsorbent can be added to the dispersion containing the fibrillated fibrous material or it may be dispersed separately in an aqueous solution to form an aqueous slurry. The amount of water used is an amount sufficient to provide a low viscosity slurry. However, care should be used to avoid excess water which can result in slow production times. The desiccant or adsorbent slurry is stirred under low shear for purposes of mixing without excessive particle breakdown.

Additives such as retention aids and binders suitable for maintaining the integrity of the desiccant paper or sorbent paper can be added to the slurry for purposes of improving paper strength by bonding fiber shafts and fibrils together to form a matrix and for retention of the desiccant on and within the fiber shafts and fibril matrix. Binders which have been found suitable for use with acrylics fibrillated fibers include acrylic latex, starch, polyvinyl alcohols, microcrystalline cellulose, for example, carboxymethyl cellulose. The final slurry being used for wet laying can contain 0.5 to 20% solids but preferably contains 2.5 to 4% solids. In addition, fire retardants, biocide materials or inert materials may be added as required.

The fibrillated fiber slurry may be first added to the headbox of a paper-making machine and then the desiccant or adsorbent slurry added thereto and mixed thoroughly. A flocculant may be added to the headbox to permit the fibrous material/sorbent suspension to form flocs which are more easily retained on the paper machine moving screen. In the desiccant or adsorbent paper-making process, the suspension is passed to a moving screen, referred to as a "wire", and water removed therefrom to form a wet paper. The wet paper is dried and pressed, if desired, by calendaring rolls to form a smooth surface on the paperboard. Typically, the paperboard is formed to a thickness in the range of 0.004 (0.10) to 0.02 (0.51) inch (mm), typically about 0.008 (0.20) inch (mm).

The desiccant or adsorbent paper thus formed containing solid desiccant or adsorbent dispersed therein during the paper manufacturing processes are formed into heat and moisture transfer bodies such as total energy transfer wheels or enthalpy wheels. Additionally, the adsorbent paper can be formed into mass transfer bodies such as adsorbent filters for contaminants. For example, the desiccant or adsorbent paper can be formed into such wheels by the formation of corrugated paper having the desired thickness and periodicity and bonded to a flat paperboard of similar composition to produce a single-faced corrugated sheet. The single-faced corrugated sheet is spirally rolled into a wheel configuration with the passages or channels formed by the corrugations and flat paperboard being parallel to the axial direction of the wheel. To maximize heat and mass transfer, the paperboard should be as thin as possible while maintaining strength to minimize the pressure drop across the wheel. Thin paperboard permits the manufacture of smaller channels to provide higher surface area for heat and mass transfer.

In this manner, an enthalpy wheel can be manufactured that provides for improved levels of moisture and heat transfer. Further, the enthalpy wheel can be readily mass produced in a cost effective manner. Conventional papermaking equipment and corrugating equipment can be used for manufacturing.

Desiccant paper samples were fabricated following steps of the invention to determine that 4A-type zeolite desiccant material and fibrillated acrylic fibers could be formed into desiccant paper.

The acrylic fibers used in non-fibrillated form had an average length of 6.5 mm with approximate 10 µm diameter. The fibrillated acrylic fibers had a length of about 4.5 mm and a diameter of 6 µm. The fibrils had an average length of about 2 mm and a diameter of about 3 µm. Cellulose fibers used had a length of 9 mm. The desiccant was a 4A molecular sieve having a channel opening of about 4 Å.

The paper sheets were formed by both making handsheets in a laboratory handsheet apparatus and using a foudrinier paper machine. The handsheet mold consisted of an open top vessel with square 12 by 12 inch wire screen at its bottom where the paper sheet was formed. The vessel was hinged immediately above the screen to allow the paper to be pealed from the screen. Below the screen was a funnel which led to a standpipe and valve. When the valve was opened, the standpipe, which was full of water, emptied, pulling a vacuum on the pulp slurry above the screen. This caused the pulp mixture to deposit on the screen, forming the paper. The wet paper was pressed gently with blotter paper to remove additional moisture before it was pealed from the screen. It is then removed and dried on a hot metal surface, i.e., photographic print drier.

The foudrinier paper machine applies the same principles as the handsheet apparatus but makes paper continuously by providing a moving wire (screen belt) which passes over a vacuum section to remove most of the water from the slurry and the paper which is formed. Before the paper is pealed from the wire, it normally travels over a wet press section where a porous roller may be used to squeeze additional moisture from the paper. Because the wire continuously moves, it can cause fibrillated fiber orientation which imparts higher tensile strength in the machine direction than in the cross direction. The paper then passes to a series of large diameter steam-heated metal rollers (called cans) which dry the paper. The paper can then optionally be calendared or pressed at high pressure between two or more steel rollers to reduce caliper and increase paper density. Paper leaving the calendar rolls or heater cans is then wound on a core.

Most of the variables (except directional tensile strength) of a papermaking machine can be simulated in a handsheet mold and commercial processes normally scale up well.

The furnish (batch mixture) is optimized to provide acceptably fast drainage rate and a high retention on the screen (usually >80%). Batch additives such as binders and flocculants are added at different parts of the process. Although 5 to 15% acrylic emulsion was used as binder, other binders such as starch or polyvinyl alcohol/acetate (PVA) could be substituted. A flocculant was added at the handsheet mold (or headbox) to provide improved drainage rates and retention.

Tensile strength is an important property of the paper produced because a minimum tensile strength of 3 to 4 lbs. and preferably >7 lbs. is needed to survive the corrugation process.

While the invention has been described in terms of preferred embodiments, the claims appended hereto are intended to encompass other embodiments which fall within the spirit of the invention.

What is claimed is:

1. A sensible and latent heat exchange media formed from an improved desiccant paper having higher strength and thinner gauge to provide increased area of media, the media having a multiplicity of passageways therethrough through which an air stream can flow, the improved desiccant paper comprised of:

(a) fibrillated organic fibers comprised of fiber shafts having fibrils extending therefrom, the fibrillated organic fibers provided in a paper web for an improved support material having improved levels of strength, the fiber shafts having a length of 1 to 30 mm and having a diameter in the range of 1 to 50 µm and said fibrils having a length in the range of 0.5 to 28 mm and a diameter in the range of 0.5 to 40 µm; and (b) desiccant material contained in said paper web to provide said improved desiccant paper, said desiccant paper capable of transferring sensible heat from a warm air stream to a cool air stream as said air stream flows through said sensible and latent heat exchange media, said desiccant material capable of adsorbing moisture from a humid air stream flowing through said sensible and latent heat exchange media and capable of releasing said adsorbed moisture into a dry air stream flowing through said passageways of said sensible and latent heat exchange media.

2. The sensible and latent heat exchange media in accordance with claim 1 wherein the fiber shafts have a length in the range of 3 to 15 mm.

3. The sensible and latent heat exchange media in accordance with claim 1 wherein the fibrils have a length in the range of 1 to 10 mm and a diameter in the range of about 1 to 10 µm.

4. The sensible and latent heat exchange media in accordance with claim 1 wherein the fibrillated organic fibers are at least one of the polymers selected from high-density polyethylenes, high-density polypropylenes, aromatic polyamides (ammids), polystyrenes, aliphatic polyamides, polyvinyl chlorides, polyesters, nylons, rayons (cellulose acetate), acrylics, acrylonitrile homopolymers, copolymers with halogenated monomers, styrene copolymers, and mixtures of polymers (polypropylene with low-density polyethylene, and high-density polyethylene with polystyrene).

5. The sensible and latent heat exchange media in accordance with claim 1 wherein said exchange media is a wheel designed for continuous recovery of sensible and latent heat from an air stream and regeneration on a continuous basis.

6. The sensible and latent heat exchange media in accordance with claim 1 wherein said fibrillated fiber is an acrylic fibrillated fiber.

7. The sensible and latent heat exchange media in accordance with claim 1 wherein said desiccant is at least a material selected from the group consisting of silica gel, activated alumina and molecular sieves.

8. The sensible and latent heat exchange media in accordance with claim 1 wherein said desiccant is a zeolite selected from the group consisting of A-type zeolites, X-type zeolites and Y-type zeolites.

9. The sensible and latent heat exchange media in accordance with claim 1 wherein said desiccant is A-type zeolite.

10. The sensible and latent heat exchange media in accordance with claim 1 wherein said desiccant is 4A-type zeolite.

11. The sensible and latent heat exchange media in accordance with claim 1 wherein said improved desiccant paper contains 5 to 85 wt. % desiccant.

12. The sensible and latent heat exchange media in accordance with claim 1 wherein said improved desiccant paper contains 15 to 75 wt. % fibrillated fibers.

13. A sensible and latent heat exchange media formed from an improved desiccant paper having higher strength and thinner gauge to provide increased area of media, the media having a multiplicity of passageways therethrough through which an air stream can flow, the improved desiccant paper comprised of:

(a) fibrillated acrylic fibers comprised of fiber shafts having a length in the range of 1 to 30 mm and fibrils extending from said fiber shafts having a length in the range of 0.5 to 28 mm, said fibrillated fibers provided in a paper web for an improved support material having improved levels of strength; and (b) 4-A type zeolite desiccant material contained in said paper web to provide said improved desiccant paper, said desiccant paper capable of transferring sensible heat from a warm air stream and releasing said absorbed sensible heat into a cool air stream as said air stream flows through said sensible and latent heat exchange media, said desiccant material capable of adsorbing moisture from a humid air stream flowing through said sensible and latent heat exchange media and capable of releasing said adsorbed moisture into a dry air stream flowing through said passageways of said sensible and latent heat exchange media.

14. An adsorbent wheel comprised of improved adsorbent paper having higher strength and thinner gauge to provide increased area, the adsorbent paper formed into a wheel configuration to have a multiplicity of passageways therethrough through which an air stream can flow, the improved adsorbent paper comprised of:

(a) fibrillated organic fibers comprised of fiber shafts having fibrils extending therefrom, the fibrillated organic fibers provided in a paper web for an improved support material having improved levels of strength, the fiber shafts having a length in the range of 1 to 30 mm and a diameter in the range of 1 to 50 µm, said fiber shafts having fibrils attached thereto having a length in the range of 0.5 to 28 mm and a diameter in the range of 0.5 to 40 µm; and (b) adsorbent material contained in said paper web to provide said improved adsorbent paper, said adsorbent paper capable of transferring sensible heat from a warm air stream and releasing said absorbed sensible heat into a cool air stream as said air stream flows through said passageways, said adsorbent material capable of adsorbing moisture from a humid air stream flowing through said passageways and capable of releasing said adsorbed moisture into a dry air stream flowing through said passageways of said wheel.

15. The adsorbent wheel in accordance with claim 14 wherein the fiber shafts have a length in the range of 3 to 15 mm.

16. The adsorbent wheel in accordance with claim 14 wherein the fibrils have a length in the range of 1 to 10 mm and a diameter in the range of about 1 to 10 µm.

17. The adsorbent wheel in accordance with claim 14 wherein the fibrillated organic fibers are at least one of the polymers selected from high-density polyethylenes, high-density polypropylenes, aromatic polyamides (ammids), polystyrenes, aliphatic polyamides, polyvinyl chlorides, polyesters, nylons, rayons (cellulose acetate), acrylics, acrylonitrile homopolymers, copolymers with halogenated monomers, styrene copolymers, and mixtures of polymers (polypropylene with low-density polyethylene, and high-density polyethylene with polystyrene).

18. The adsorbent wheel in accordance with claim 14 wherein said exchange media is a wheel designed for continuous recovery of sensible and latent heat from an air stream and regeneration on a continuous basis.

19. The adsorbent wheel in accordance with claim 14 wherein said fibrillated fiber is an acrylic fibrillated fiber.

20. The adsorbent wheel in accordance with claim 14 wherein said adsorbent is at least a material selected from the group consisting of silica gel, activated alumina and molecular sieves.

21. The adsorbent wheel in accordance with claim 14 wherein said adsorbent is a zeolite selected from the group consisting of A-type zeolites, X-type zeolites and Y-type zeolites.

22. The adsorbent wheel in accordance with claim 14 wherein said adsorbent is A-type zeolite.

23. The adsorbent wheel in accordance with claim 14 wherein said adsorbent is 4A-type zeolite.

24. The improved adsorbent wheel in accordance with claim 14 wherein said paper contains 5 to 85 wt. % desiccant.

25. The improved adsorbent wheel in accordance with claim 14 wherein said paper contains 15 to 75 wt. % fibrillated fibers.

26. The improved adsorbent wheel in accordance with claim 14 wherein said paper contains 30 to 55 wt. % fibrillated fibers.

27. An improved adsorbent paper having higher strength and thinner gauge to provide increased area of media, the paper suitable for forming into adsorbent wheel having a multiplicity of passageways therethrough through which an air stream can flow, the improved adsorbent paper comprised of:

(a) fibrillated organic fibers comprised of fiber shafts having fibrils extending therefrom, the fibrillated organic fibers provided in a paper web for an improved support material having improved levels of strength, the fiber shafts having a length in the range of 1 to 30 mm and a diameter in the range of 1 to 50 µm, said fiber shafts having fibrils attached thereto having a length in the range of 0.5 to 28 mm and a diameter in the range of 0.5 to 40 µm; and (b) adsorbent material contained in said paper web to provide said improved adsorbent paper, said adsorbed paper capable of transferring sensible heat from a warm air stream and releasing said absorbed sensible heat into a cool air stream as said air stream flows through said passageways, said adsorbent material capable of adsorbing moisture from a humid air stream flowing through said passageways and capable of releasing said adsorbed moisture into a dry air stream flowing through said passageways.

28. The adsorbent paper in accordance with claim 27 wherein the fiber shafts have a length in the range of 3 to 15 mm.

29. The adsorbent paper in accordance with claim 27 wherein the fibrils have a length in the range of 1 to 10 mm and a diameter in the range of about 1 to 10 µm.

30. The adsorbent paper in accordance with claim 27 wherein the fibrillated organic fibers are at least one of the polymers selected from high-density polyethylenes, high-density polypropylenes, aromatic polyamides (ammids), polystyrenes, aliphatic polyamides, polyvinyl chlorides, polyesters, nylons, rayons (cellulose acetate), acrylics, acrylonitrile homopolymers, copolymers with halogenated monomers, styrene copolymers, and mixtures of polymers (polypropylene with low-density polyethylene, and high-density polyethylene with polystyrene).

31. The adsorbent paper in accordance with claim 27 wherein said exchange media is a wheel designed for continuous recovery of sensible and latent heat from an air stream and regeneration on a continuous basis.

32. The adsorbent paper in accordance with claim 27 wherein said fibrillated fiber is an acrylic fibrillated fiber.

33. The adsorbent paper in accordance with claim 27 wherein said desiccant is a zeolite.

34. The adsorbent paper in accordance with claim 27 wherein said desiccant is a zeolite selected from the group consisting of A-type zeolites, X-type zeolites and Y-type zeolites.

35. The adsorbent paper in accordance with claim 27 wherein said desiccant is A-type zeolite.

36. The adsorbent paper in accordance with claim 27 wherein said desiccant is 4A-type zeolite.

37. The adsorbent paper in accordance with claim 27 wherein said improved adsorbent paper contains 5 to 85 wt. % desiccant.

38. The adsorbent paper in accordance with claim 27 wherein said improved adsorbent paper contains 15 to 75 wt. % fibrillated fibers.

* * * * *